Patented June 9, 1936

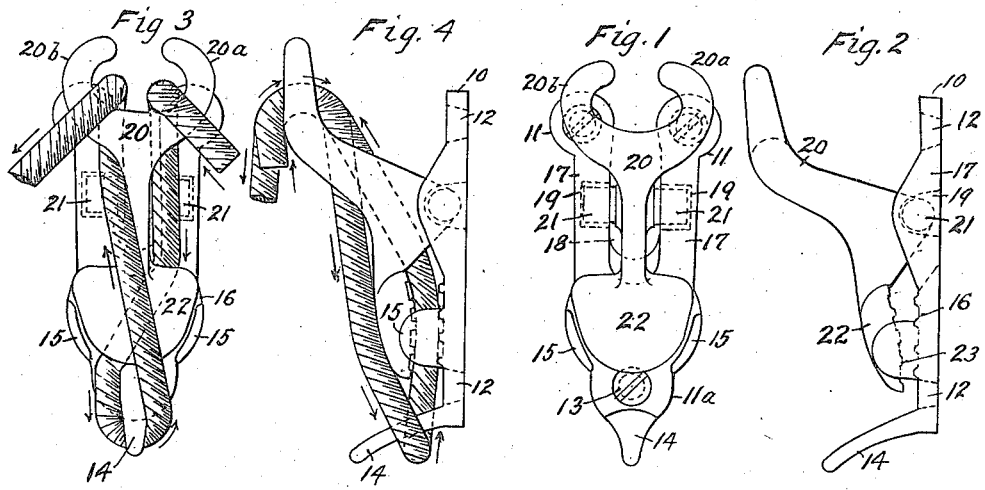
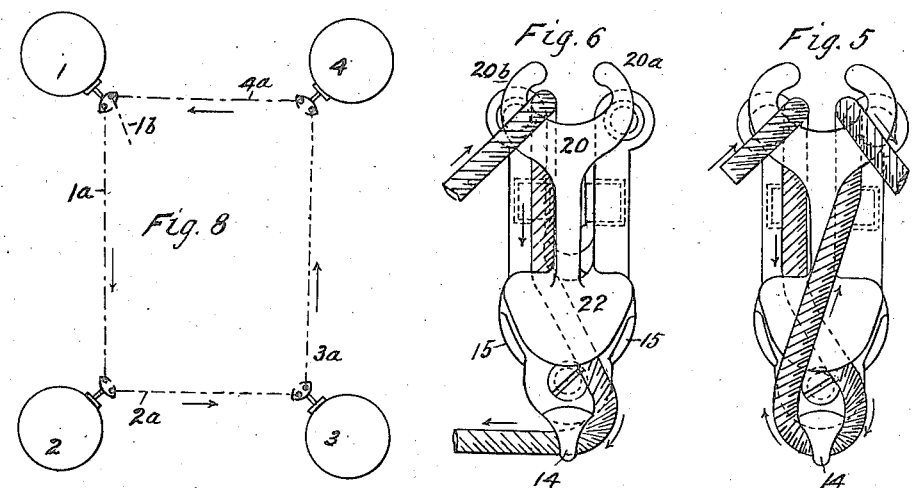
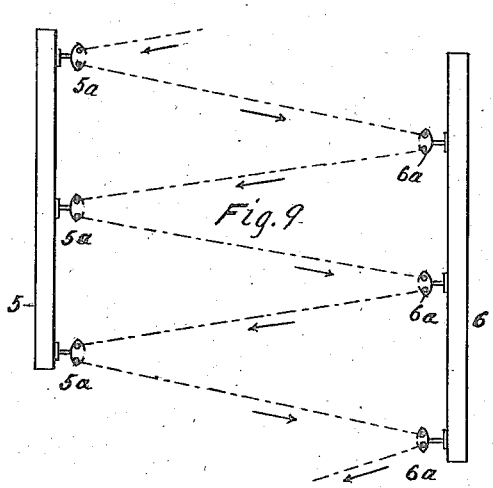

2,043,299

UNITED STATES PATENT OFFICE 2,043,299

LINE HOLDER

William J. Martin, Nutley, N. J.

Application August 30, 1934, Serial No. 742,120

8 Claims. (Cl. 24—132)

This invention relates to line-holders of the class more particularly adapted to support clothes-lines for use on laundry work.

The objects of the invention include means for instantly connecting or disconnecting a line from the holder and thus avoid the objectional method of tying and untying knots in the line to be hung.

A further object is to provide a series of holders arranged to connect a single line in a manner to form a plurality of sections adapted to be securely held together and directed in variable directions to desired points of support, such as fixed posts, building walls, trees, etc.

A further object is to provide means for separately tightening the line-sections and securing the same against release when an adjacently connected overloaded line becomes broken and falls.

A further object is to provide an effective gripping action upon the line, and means for providing for the line a variable direction of lead to and from said holder.

For further comprehension of the invention, and of the objects and advantages thereof, reference is had to the following description and accompanying drawing, and to the appended claims in which the various features of the invention are more particularly set forth.

Referring to the drawing in which similar characters of reference designate like parts throughout the several views:

Figure 1 is a front face elevational view of a line-holder embodying my invention.

Figure 2 is a side elevational view taken at right-angles to Fig. 1.

Figure 3 is a front face view similar to that of Fig. 1, showing one of the preferred forms of connecting a line with a right-hand lead into the holder and a left-hand pass therefrom.

Figure 4 is a side view similar to that of Fig. 2, showing the path of the line leading therethrough.

Figure 5 is a front face view similar to that of Fig. 3, showing another of the preferred forms of line connections having a left-hand lead into the holder and a right-hand pass therefrom.

Figure 6 is a similar front face view of the holder showing a connection-line having a left-hand lead thereto and therefrom.

Figure 7 is a similar front face view of the holder showing a connection-line having a right-hand lead thereto and therefrom.

Figure 8 is a diagrammatic plan view of a plurality of connection posts, each provided with a holder connected with line-sections.

Figure 9 is a diagrammatic plan view indicating a pair of opposite building walls to which are fixed a plurality of line-holders connected with line sections disposed in staggered relation with one another.

In the views shown in Figs. 1 and 2 of the drawing, numeral 10 designates a baseplate having lugs 11 provided with screw-holes 12 adapted to receive the screws 13 for securing the holder in position upon a suitably fixed post or house-wall, the lower lug 11a having an outwardly and downwardly projecting horn 14 shaped to form a line-receiving hook. Adjacent its lower end the baseplate is formed with a pair of outwardly projecting stop-guides 15 disposed to laterally position the line, and between said stop-guides the outer surface of the baseplate is serrated to form a frictional clamping face 16 acting to arrest the movement of said line. At its upper end the baseplate is also provided with a pair of longitudinal arms 17 spaced apart by the slot 18, the upper ends of said arms being formed with the above-mentioned screw-lugs 11. The arms of the baseplate are each provided with a recess 19 open at their bottom side wall and shaped to receive a pivotal bearing surface.

Mounted within the baseplate 10 is a clamp lever 20 having on opposite sides projecting pivot ends 21 arranged to be inserted within the opposite recesses 19 of the baseplate and disposed for pivotal movement therein when the latter is secured to its support. At its upper end the lever 20 is forked and comprises a pair of spaced inturned hooks 20a and 20b, and at its opposite or lower end the lever 20 is formed with a clamping jaw 22 having its inner face serrated at 23 to conform with the corresponding surface 16 of the baseplate 10 with which it coacts to arrest the movement of the line in the latter's passage therebetween.

Having secured several of the line-holders to the posts 1, 2, 3, and 4 as shown in the diagrammatic view, Fig. 8, in which the lines are indicated by alternate dots and dashes, and the direction of connection by arrows, the manner of connection being preferably such as is shown in Fig. 3. With the operator facing toward the holder and post, the connections may be quickly made by suspending a coiled line from the left arm and grasping the coil adjacent its free end by the right hand and passing it over the hook 20a, leaving the free end of the line hanging loosely in front of the hook; the clamping jaw 22 is then opened by pressing inwardly on the upper end of the lever 20 with the right hand, the left hand being then used to pass the adjacent inner portion of the line downwardly along the right-hand side of the lever and under the clamping jaw, and then from left to right under the horn 14, then upwardly and rearwardly over the outer face of the clamping jaw and under and over the hook 20b at the upper end of lever 20. A tension on the line at this latter point serves to outwardly urge the upper end of the lever to grip and hold the line by the clamping jaw 22. The passages of the line through the holders to form the several line sections held by the posts shown in Fig. 8 are similar to each other. Beginning at post 1, the tension on line section 1a serves to lock the line within its holder, as above described, and prevent displacement of its free end 1b. The holders attached to the posts 2, 3, and 4 are successively connected in a similar manner to respectively form the line sections 1a, 2a, 3a, and 4a, the end of the latter line section being connected to a second holder fixed at a separate level on post 1, each of the line sections having a right-hand lead into the holders. In Fig. 9, the opposite building-walls 5 and 6 are respectively provided with holders 5a having right-hand leads thereto, and 6a having left-hand leads, indicated respectively in detail views in Figs. 3 and 5. With the line sections thus arranged in angular relations it is obvious that the same may be indefinitely extended.

It is to be observed that the use of the horn 14 not only provides means directing right and left hand passages of the line to form numerous line sections, but also provides a double clamping effect upon the line, including a direct gripping action thereon occasioned by the pivotal movement of the lever effected by the outward tension of the line leading therefrom, and an added clamping effect caused by the pressure exerted upon the outer surface of the clamping jaw by the passage of the line thereover. Furthermore the horn 14 serves to centrally direct the line in a diagonally extended direction under the clamping jaw 22 to effect a more positive gripping action.

The holders as thus provided with multiple clamping action controlled by the horn 14 are adapted to be operated for separately tightening the several line sections by disconnecting the outgoing portion thereof from the upper end of the lever and from around the horn, and in which unwound position a pull on the outgoing line will serve to tighten the incoming one and permit locking replacement thereof, and by which means the several lines may be securely clamped against release when an adjacently connected overloaded line becomes broken and falls.

I claim:

1. A line holder comprising a baseplate attachable to a support and provided with an outer clamping face, a clamp-lever pivoted between its ends to said baseplate and extending outwardly therefrom and provided at its lower end with a clamping jaw coactive with the clamping face of said baseplate, a pair of inturned hooks spaced apart from each other at the upper end of said lever, and an outwardly and downwardly projecting horn disposed at the lower end of said baseplate and coactive with said inturned hooks to pass the line inwardly over the top of one of said inturned hooks and downwardly between the clamping faces of said baseplate and clamping jaw and around the lower face of said horn and upwardly to engage the outer surface of the clamping jaw and inwardly and outwardly and under and over the top of the opposite inturned hook, to receive by the tension on said line an outward movement of the upper end of said lever to operate said clamping faces and lock the line.

2. A line holder comprising a baseplate attachable to a support and provided with an outer clamping face, a clamp-lever pivoted between its ends to said baseplate and extending outwardly therefrom and provided at its lower end with a clamping jaw coactive with the clamping face of said baseplate, a pair of inturned hooks spaced apart from each other at the upper end of said lever, and an outwardly and downwardly projecting horn disposed at the lower end of said baseplate and coactive with said inturned hooks to pass the line inwardly over the top of one of said inturned hooks and downwardly and diagonally between the clamping faces of said baseplate and said clamping jaw and around the lower face of said horn and upwardly to engage the outer surface of the clamping jaw and inwardly and outwardly, under and over, the top of the opposite inturned hook.

3. A line holder comprising a baseplate attachable to a support and provided with an outer clamping face, a clamp-lever pivoted between its ends to said baseplate and extending outwardly therefrom and provided at its lower end with a clamping jaw coactive with the clamping face of said baseplate, a pair of inturned hooks spaced apart from each other at the upper end of said lever, and an outwardly and downwardly projecting horn disposed at the lower end of said baseplate and coactive with said inturned hooks to pass the line inwardly over the top of one of said inturned hooks and downwardly and diagonally between the clamping faces of said baseplate and said clamping jaw and around the lower face of said horn and upwardly and diagonally to engage the outer face of said clamping jaw and inwardly and outwardly, under and over, the top of the opposite inturned hook.

4. A line holder comprising a baseplate attachable to a support and provided with an outer clamping face, a clamp-lever pivoted between its ends to said baseplate and extending outwardly therefrom and provided at its lower end with a clamping jaw coactive with the clamping face of said baseplate, a pair of inturned hooks spaced apart from each other at the upper end of said lever, and an outwardly and downwardly projecting horn disposed at the lower end of said baseplate and coactive with said inturned hooks to pass the line inwardly over the top of one of said inturned hooks and downwardly and diagonally between the clamping faces of said baseplate and said clamping jaw and around the lower face of said horn and upwardly and diagonally to engage the outer face of said clamping jaw, in opposite cross direction from the diagonal line within said jaw, and inwardly and outwardly, under and over, the top of the opposite inturned hook.

5. A line holder comprising a baseplate attachable to a support and provided with an outer clamping face, a clamp-lever pivoted between its ends to said baseplate and extending outwardly therefrom and provided at its lower end with a clamping jaw coactive with the clamping face of said baseplate, a pair of inturned hooks spaced apart from each other at the upper end of said lever, and an outwardly and downwardly projecting horn disposed at the lower end of said baseplate and coactive with said inturned hooks to pass the line inwardly over the top of one of said inturned hooks and downwardly and diagonally between the clamping faces of said baseplate and said clamping jaw and around the lower face of said horn and upwardly and diagonally to engage the outer face of said clamping jaw in engagement therewith, in opposite direction from the diagonal line within said jaw and inwardly and outwardly, under and over, the top of the opposite inturned hook.

6. In a line holder, the combination with the fixed baseplate and the clamping lever pivoted thereto, of a horn projecting outwardly from said baseplate and disposed to guide the passage of said line to engage the opposite faces of the clamping jaw of said clamp lever and effect a double clamping action with respect to said baseplate.

7. In a line holder a baseplate having an outer clamping face, a clamping lever pivoted between its ends to said baseplate and forming an upper operating arm and a lower clamping jaw having an inner clamping face cooperating with the clamping face of said baseplate, a guiding horn projecting from said baseplate and shaped to guide the line downwardly from said operating arm of said clamping lever and between the cooperating clamping faces of said clamping jaw and baseplate, thence upwardly for engagement with the outer face of said clamping jaw and for returning the line to the upper operating end of the clamping lever and effecting a double clamping action of the holder upon the line.

8. In a line holder a baseplate having an outer clamping face, a clamping lever pivoted between its ends to said baseplate and forming an upper operating arm and a lower clamping jaw having an inner clamping face cooperating with the clamping face of said baseplate, a guiding horn projecting from said baseplate and shaped to guide the line downwardly from said operating arm of said clamping lever and between the cooperating clamping faces of said clamping jaw and baseplate, thence upwardly for engagement with the outer face of said clamping jaw and for the return of the line to the upper operating end of the clamping lever, the passages of the line over the inner and outer surfaces of the clamping jaw being diagonally positioned in cross relation with respect to each other.

WILLIAM J. MARTIN.